(12) United States Patent
Hershkowitz et al.

(10) Patent No.: US 11,067,686 B2
(45) Date of Patent: Jul. 20, 2021

(54) OBSTACLE POSITION AND EXTENT MEASUREMENT BY AUTOMOTIVE RADAR

(71) Applicant: Electromagnetic Systems, Inc., El Segundo, CA (US)

(72) Inventors: Stephen Jeffrey Hershkowitz, Manhattan Beach, CA (US); Brian Michael Lamb, Manhattan Beach, CA (US)

(73) Assignee: Electromagnetic Systems, Inc., El Segundo, CA (US)

( * ) Notice: Subject to any disclaimer, the term of this patent is extended or adjusted under 35 U.S.C. 154(b) by 150 days.

(21) Appl. No.: 16/207,103

(22) Filed: Dec. 1, 2018

(65) Prior Publication Data

US 2019/0196006 A1    Jun. 27, 2019

Related U.S. Application Data

(60) Provisional application No. 62/593,255, filed on Dec. 1, 2017.

(51) Int. Cl.

| | | |
|---|---|---|
| *G01S 13/931* | (2020.01) | |
| *G01S 13/90* | (2006.01) | |
| *G01S 13/44* | (2006.01) | |
| *G01S 7/292* | (2006.01) | |
| *G01S 7/288* | (2006.01) | |
| *G01S 13/00* | (2006.01) | |

(52) U.S. Cl.
CPC ............ *G01S 13/931* (2013.01); *G01S 7/288* (2013.01); *G01S 7/292* (2013.01); *G01S 13/449* (2013.01); *G01S 13/904* (2019.05); *G01S 13/9043* (2019.05)

(58) Field of Classification Search
None
See application file for complete search history.

(56) References Cited

U.S. PATENT DOCUMENTS

| | | | |
|---|---|---|---|
| 5,128,874 A * | 7/1992 | Bhanu ................... | G01S 17/931 701/301 |
| 6,520,915 B1 * | 2/2003 | Lin ....................... | G01S 7/52047 600/443 |
| 8,305,253 B1 * | 11/2012 | Hershkowitz ......... | G01S 13/904 342/25 A |
| 8,686,326 B1 * | 4/2014 | Dennison ................ | G01S 3/784 244/3.16 |
| 9,417,323 B2 * | 8/2016 | Carande ................ | G01S 13/904 |
| 9,664,789 B2 * | 5/2017 | Rosenblum ............ | G01S 13/931 |
| 10,042,047 B2 * | 8/2018 | Stainvas Olshansky ..................... G01S 13/89 | |
| 10,094,919 B2 * | 10/2018 | Levi ....................... | G01S 13/867 |
| 10,217,024 B2 * | 2/2019 | Baba ..................... | G01S 13/931 |

(Continued)

*Primary Examiner* — Bernarr E Gregory
(74) *Attorney, Agent, or Firm* — Alonzo & Assocites; Arlyn Alonzo

(57) ABSTRACT

Aspects of the disclosure are directed towards obstacle position and extent measurement. In accordance with one aspect, obstacle detection includes creating one or more interferometric measurements to generate a flow of response position locations using a flow of range/Doppler detections by fitting a parametric expression; and deriving one or more scatterer positions and obstacle position and extent measurements from the flow of response position locations.

24 Claims, 5 Drawing Sheets

(56) References Cited

U.S. PATENT DOCUMENTS

2006/0220946 A1* 10/2006 Nohmi .................. G01S 13/904
  342/107
2006/0220949 A1* 10/2006 Nohmi .................. G01S 13/904
  342/160

* cited by examiner

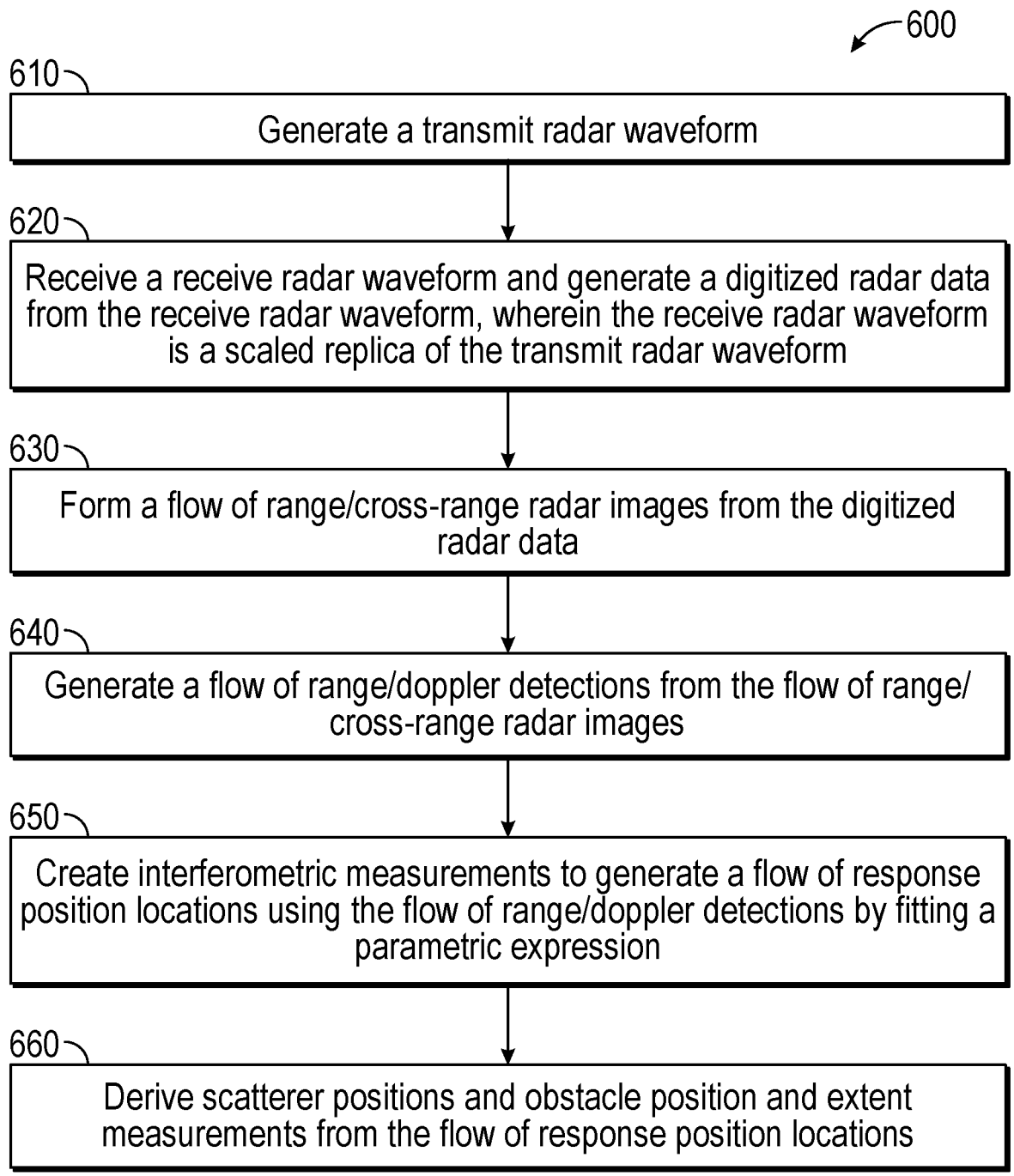

OBSTACLE POSITION AND EXTENT MEASUREMENT BY AUTOMOTIVE RADAR

CLAIM OF PRIORITY UNDER 35 U.S.C. § 119

The present Application for Patent claims priority to Provisional Application No. 62/593,255 entitled "OBSTACLE POSITION AND EXTENT MEASUREMENT BY AUTOMOTIVE RADAR" filed Dec. 1, 2017, and assigned to the assignee hereof and hereby expressly incorporated by reference herein.

TECHNICAL FIELD

This disclosure relates generally to the field of radar detection, and, in particular, to obstacle position and extent measurement by an automotive radar.

BACKGROUND

The present disclosure relates to an automotive radar for measuring the positions and extents of obstacles on a road. In one example, a purpose for the measurements is to determine whether a vehicle on the road must change course to avoid colliding with an obstacle. In one example, the measurements may include an obstacle's height.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides techniques and apparatus relating to obstacle position and extent measurement. Accordingly, the disclosure provides a method for obstacle detection, the method including creating one or more interferometric measurements to generate a flow of response position locations using a flow of range/Doppler detections by fitting a parametric expression; and deriving one or more scatterer positions and obstacle position and extent measurements from the flow of response position locations.

In one example, the method further includes receiving a receive radar waveform and generating a digitized radar data from the receive radar waveform. In one example, the receive radar waveform is a scaled replica of a transmit radar waveform with a time delay $\tau$ (tau) and a Doppler shift $\nu$ (nu) for a scatterer. In one example, the receive radar waveform is a scaled replica of a transmit radar waveform.

In one example, the method further includes forming a flow of range/cross-range radar images from the digitized radar data. In one example, the flow of range/cross-range radar images includes a plurality of resolution cells. In one example, the plurality of resolution cells includes a range resolution determined by a signal bandwidth and a cross-range resolution determined by an angular rotation of radar line of sight.

In one example, the method further includes generating the flow of range/Doppler detections from the flow of range/cross-range radar images. In one example, the method further includes generating the transmit radar waveform, wherein the transmit radar waveform is a coherent pulsed radar waveform with a plurality of pulses over a coherent time duration. In one example, the parametric expression includes a relative spacing of a ground-bounce and a direct return from a scatterer.

In one example, the method further includes deriving the one or more scatterer positions and obstacle position and extent measurements by determining a simultaneous solution for a plurality of scatterers with a least-squares fit using numerical optimization. In one example, the method further includes deriving the one or more scatterer positions and obstacle position and extent measurements by determining an iterative scatterer-by-scatterer solution based on a deconvolution algorithm. In one example, the deconvolution algorithm is a CLEAN algorithm.

Another aspect of the disclosure provides an apparatus for obstacle detection, the apparatus including an interferometric processor to create one or more interferometric measurements to generate a flow of response position locations using a flow of range/Doppler detections by fitting a parametric expression; and a scatterer processor, coupled to the interferometric processor, to derive one or more scatterer positions and obstacle position and extent measurements from the flow of response position locations. In one example, the interferometric processor and the scatterer processor are two separate components of the apparatus.

In one example, the apparatus further includes a radar transceiver to receive a receive radar waveform and to generate a digitized radar data from the receive radar waveform. In one example, the receive radar waveform is a scaled replica of a transmit radar waveform with a time delay $\tau$ (tau) and a Doppler shift $\nu$ (nu) for a scatterer. In one example, the transmit radar waveform is a coherent pulsed radar waveform with a plurality of pulses over a coherent time duration.

In one example, the apparatus further includes an image processor, coupled to the radar transceiver, to form a flow of range/cross-range radar images from the digitized radar data. In one example, the apparatus further includes a detection processor, coupled to the image processor, to generate the flow of range/Doppler detections from the flow of range/cross-range radar images.

In one example, the scatterer processor derives the one or more scatterer positions and obstacle position and extent measurements by determining a simultaneous solution for a plurality of scatterers with a least-squares fit using numerical optimization. In one example, the scatterer processor derives the one or more scatterer positions and obstacle position and extent measurements by determining an iterative scatterer-by-scatterer solution based on a deconvolution algorithm.

These and other aspects of the disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 6 illustrates an example flow diagram for measuring positions and extents of obstacles on a road.

DETAILED DESCRIPTION

Figure 1:
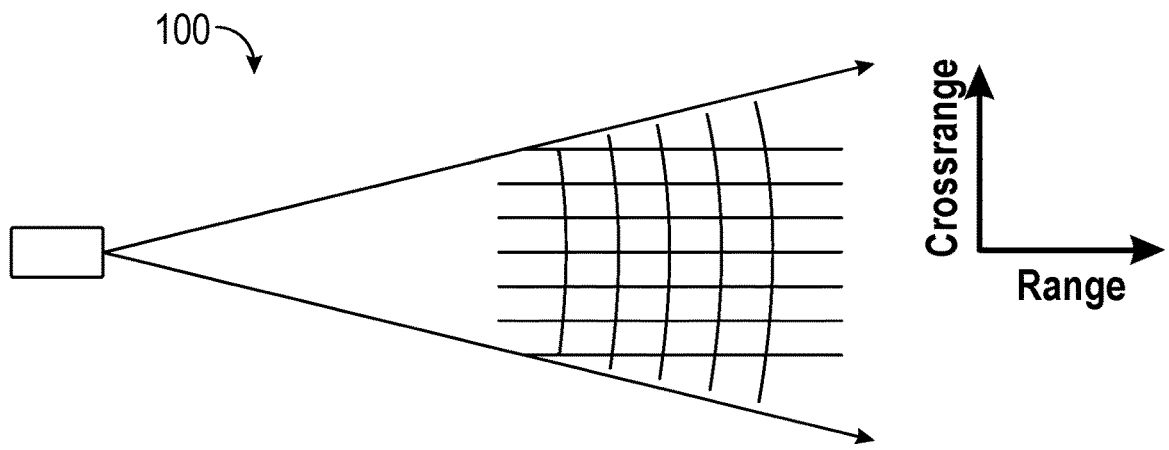
FIG. 1 illustrates an example arrangement of range/cross-range resolution cells on the ground when a vehicle turns.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In one example, a radar may produce a two-dimensional output in each channel, e.g., a radar image as a function of two dimensions, such as range and cross-range (or Doppler offset). A channel may be associated with one transmit antenna and one receive antenna. For example, the radar image may be comprised of a plurality of two-dimensional resolution cells, where a first dimension is comprised of a plurality of range bins (e.g., range resolution cells) and a second dimension is comprised of a plurality of cross-range bins (or Doppler bins) (e.g., cross-range resolution cells or Doppler resolution cells). Each resolution cell may include one or more scatterers, i.e., an object which reflects transmitted electromagnetic waves from a radar transmitter and converts it into received electromagnetic waves to a radar receiver. One example of an object is an obstacle, for example, an obstacle in a road. In one example, the automotive radar may be used to detect obstacles in the road so that the vehicle may avoid a collision with the obstacle.

In one example, a radar may possess multiple channels for spatial diversity (e.g., electronically scanned array automotive radars, Multiple Input Multiple Output (MIMO) automotive radars). For example, transmit and receive antennas in the radar may be positioned in close proximity. For example, the spacings of the antennas (i.e., both transmit antennas and receive antennas) may determine transmit and receive beamwidths, i.e., transmit and receive angular resolution. The beamwidths may be much larger than obstacles at the ranges of interest. That is, the angular resolution of the radar typically may not resolve, i.e., subdivide, a radar image of an obstacle into a plurality of resolution cells. In one example, the transmit antenna produces a transmit antenna pattern, and the receive antenna produces a receive antenna pattern. The transmit antenna pattern and the receive antenna pattern may each include a mainlobe (i.e., a primary lobe around boresight in the transmit or receive antenna) and a plurality of sidelobes (i.e., secondary lobes away from boresight in the transmit or receive antenna pattern). The present disclosure applies whether or not the angular resolution of the radar subdivides the radar image of the obstacle into resolution cells, and applies for both fixed and scanned beams. For example, the obstacle may include a plurality of scatterers within the plurality of resolution cells.

In one example, for an accurate measurement of positions of the plurality of scatterers constituting an obstacle, thereby defining its extent, the radar must subdivide the radar image into resolution cells. In one example, a radar signal bandwidth provides range resolution (i.e., size of the range resolution cell). In one example, angular rotation of a radar line of sight with respect to the obstacle provides cross-range resolution (i.e., size of the cross-range resolution cell). In one example, a plurality of range resolution cells and cross-range resolution cells comprises a range/cross-range radar image. In one example, shapes of the cross-range resolution cells may depend on whether the vehicle turns and, if it turns, the size of the cross-range resolution cell is inversely proportional to the size of the vehicle turn. The present disclosure applies whether or not the vehicle turns.

In one example, the present disclosure deduces physical positions of scatterers by combining measured range/cross-range positions of responses in a radar image, interferometric measurements of angular positions of those responses, and/or contextual information (e.g., the propagation path for some responses includes reflection from the ground). In one example, the interferometric measurements accommodate multiple responses within a resolution cell, for example, from one or multiple scatterers, from ground-bounce and/or direct returns, and/or from mainlobe and sidelobe responses of the receive antenna.

Figure 4:
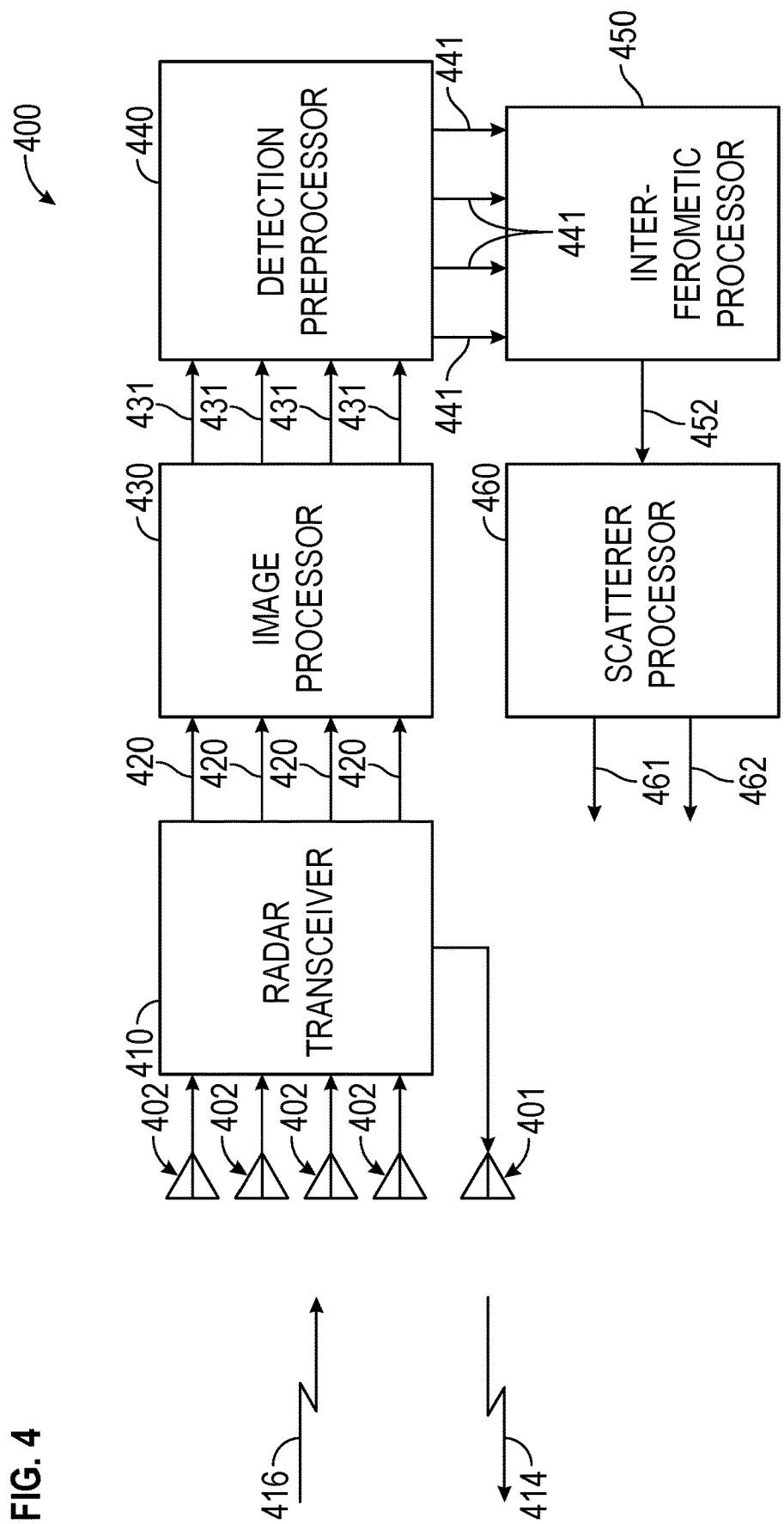
FIG. 4 illustrates an example block diagram of an automotive radar in accordance with the present disclosure.

FIG. 4 illustrates an example block diagram 400 of an automotive radar in accordance with the present disclosure. FIG. 4 shows one or more transmit antenna elements 401. Although only one transmit antenna element is shown, one skilled in the art would understand that more than one transmit antenna element may be included within the spirit and scope of the present disclosure. FIG. 4 also shows four receive antenna elements 402. Although four receive antenna elements are shown, one skilled in the art would understand that less than four or more than four antenna elements may be included within the spirit and scope of the present disclosure.

A radar transceiver 410 is shown coupled to the transmit antenna element 401 and the receive antenna elements 402. In one example the radar transceiver 410 includes a radar transmitter. And, in one example, the radar transceiver 410 includes a radar receiver. In one example, the radar transceiver 410 may generate a transmit radar waveform which is converted to a transmitted electromagnetic wave 414 by the one or more transmit antenna elements 401. The transmit radar waveform may, for example, be a coherent pulsed radar waveform with a plurality of pulses over a coherent time duration.

In one example, the radar transceiver 410 may receive a receive radar waveform from a received electromagnetic wave 416. The receive radar waveform may be a scaled replica of the transmit radar waveform. In one example, the receive radar waveform may a scaled replica of the transmit radar waveform with a time delay τ (tau) and a Doppler shift ν (nu) for a scatterer. In one example, output from the radar transceiver 410 is digitized radar data 420 for each receive antenna element 402. In one example, the digitized radar data 420 is generated by an analog-to-digital converter (ADC) (not shown) which converts the receive radar waveform to the digitized radar data 420 in the radar transceiver 410. In one example, the digitized radar data 420 may be indexed (i.e., labeled) as a function of delay index and a pulse index. In one example, the delay index may be denoted as a fast time. In one example, the pulse index may be denoted as a slow time.

In one example, the digitized radar data 420 may include amplitude information and phase information of the receive radar waveform. That is, the digitized radar data 420 may be expressed as a sequence of complex values. In one example, the amplitude information represents a magnitude of the receive radar waveform. In one example, the phase information represents a relative phase of the receive radar waveform. In one example, the digitized radar data 420 may be expressed in an orthogonal signal format, for example, with in-phase components and quadrature components.

In one example, an image processor 430 accepts the digitized radar data 420 as an input and forms a flow of range/cross-range radar images. In one example, the image processor 430 outputs the flow of range/cross-range radar images 431. The flow of range/cross-range radar images 431 may include a plurality of radar images from each channel. In one example, the flow of range/cross-range radar images 431 includes a plurality of range and cross-range resolution cells.

In one example, the plurality of resolution cells may be indexed by a range index and a cross-range index. Angular rotation of the radar line of sight over the coherent time duration may determine a size of the cross-range resolution cells.

The flow of range/cross-range radar images 431 may include a designation of image type. For example, image type may include focused image, unfocused image, partially focused image, turning-radar image, and non-turning-radar image. In one example, a non-turning radar image may be a forward-looking SAR image.

In one example, the flow of range/cross-range radar images 431 may be expressed as a sequence of complex image values. For example, the sequence of complex image values may include amplitude image values and phase image values. And, the sequence of complex image values may include in-phase image values and quadrature image values.

In one example, a detection preprocessor 440 (e.g., a processor coupled to a memory unit) inputs the flow of range/cross-range radar images 431 which is used for thresholding, Constant False Alarm Rate (CFAR) detection, or similar detection operation. In one example, the detection preprocessor 440 generates a flow of range/Doppler detections 441 as outputs. In one example, the flow of range/Doppler detections 441 is a flow of range/cross-range detections.

In one example, the flow of range/Doppler detections 441 may be expressed as a sequence of complex detection values. For example, the sequence of complex detection values may include amplitude detection values and phase detection values. And, the sequence of complex detection values may include in-phase detection values and quadrature detection values.

In one example, the flow of range/Doppler detections 441 is sent as input to an interferometric processor 450. In one example, the interferometric processor 450 may be coupled to a memory unit. In one example, the interferometric processor 450 generates interferometric measurements. For example, the interferometric measurements may be produced by coherent combination of the flow of range/Doppler detections 441 to generate a flow of response position locations 452. In one example, coherently combining of the flow of range/Doppler detections 441 includes processing a sequence of complex detection values. In one example, the flow of response position locations 452 is sent as an input to a scatterer processor 460. In one example, the scatterer processor 460 generates scatterer positions 461 and obstacle positions and extent measurements 462.

As shown in FIG. 4, one or more transmit antenna elements 401 and multiple receive antenna elements 402 may be connected to the automotive radar transceiver 410. Digitized radar data 420 from each receive channel may be processed in image processor 430 into a flow of range/cross-range radar images 431 for each real receive channel or virtual receive channel. In one example, several seconds of data may be processed coherently (i.e., a coherent dwell) to form the image. In one example, coherent processing involves digital signal processing with amplitude information and phase information of the digitized radar data 420. In one example, the coherent dwell may be reduced relative to a maximum coherent dwell time, depending on vehicle speed, position of the radar on the vehicle, and/or whether an autonomous driving system is in use (in which case, small vehicle maneuvers within a lane can be exploited). In the case of a MIMO radar, the image processor 430 includes the MIMO processing required to generate virtual receive channels.

In one example, the flow of range/cross-range radar images 431 includes an image for each channel. The images may be inputted to a detection preprocessor 440 which outputs a flow of detections, for example, the flow of range/Doppler detections 441. Each flow of detections may include complex image values (e.g., amplitude image values and phase image values) from corresponding pixels of an image for each channel that is inputted to the detection preprocessor 440. The flow of range/Doppler detections 441 may be inputted to interferometric processor 450. Interferometric measurements and a flow of response position locations may be fused into scatterer positions 461, which may be clustered into obstacle position and extent measurements 462 in scatterer processor 460.

In one example, when a vehicle turns, the flow of range/cross-range radar images 431 may be formed in the image processor 430 via digital signal processing. In one example, the digital signal processing includes a motion compensation of a single point followed by a two-dimensional fast Fourier transform (FFT). Motion compensation may be performed, for example, by autofocusing. Motion compensation may include quadratic phase error processing based on sensed vehicle dynamic parameters. In one example, sensed vehicle dynamic parameters may include position, velocity and acceleration as functions of time.

In one example, a plurality of resolution cells in a radar image is generated which defines a horizontal grid of nearly rectangular resolution cells. FIG. 1 illustrates an example arrangement 100 of range/cross-range resolution cells on the ground when a vehicle turns.

Synthetic-aperture radar (SAR) is a form of radar that is used to create two-dimensional images.

Figure 2:
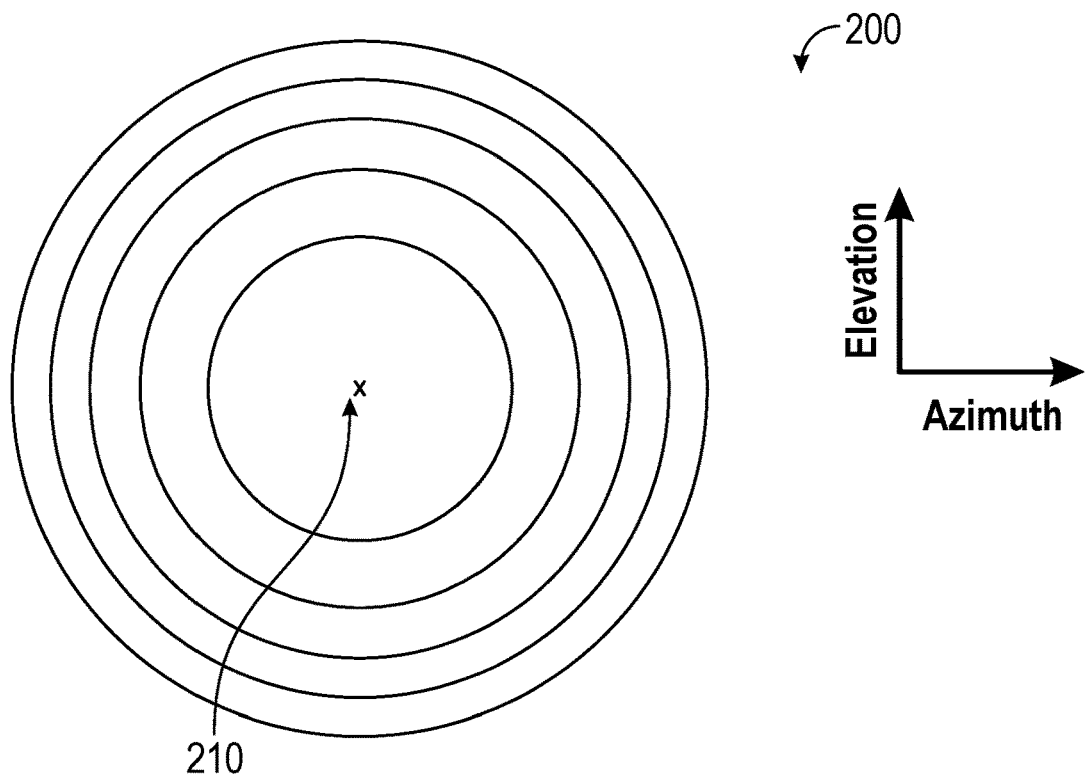
FIG. 2 illustrates an example arrangement of cross-range resolution cells in a single range bin when a vehicle moves straight, toward an 'x' at a depicted center point.

In one example, when a vehicle trajectory is a straight line, image formation processing in the image processor 430 may be forward-looking SAR (FSAR) image formation processing. For example, annular cross-range resolution cells may be generated, centered on the line of the vehicle trajectory and with width decreasing with the distance from the vehicle trajectory, as shown in FIG. 2. FIG. 2 illustrates an example arrangement 200 of cross-range resolution cells in a single range bin when a vehicle moves straight, toward an 'x' at a depicted center point 210.

For example, a radar may combine the plurality of receive channels in a variety of ways. In one example, a sum channel may be a superposition of two or more receive channels. In one example, a difference channel may be a subtraction between two or more receive channels.

In one example, an application of digital signal processing may be prescribed as an input, determined from auxiliary data if available, or determined adaptively from radar data. In the latter case, an image may be formed in a sum channel as if the vehicle is turning and the degree of focus of the image is measured. For example, the degree of focus may be measured by an absolute value of its entropy. In one example, entropy may be defined as $H = \Sigma p_i \log_b p_i$, where $p_i$ is a probability measure, log is a logarithmic function (with base b) and $\Sigma$ represents summation over index i.

If the measured degree of focus is below a predetermined threshold, the forward-looking SAR (FSAR) image may be generated in a sum channel and the degree of focus is measured. In one example, the flow of range/cross-range radar images 431 may be a better-focused image type, with a same image type for each channel.

The flow of range/cross-range radar images 431 from each receive channel may be inputted to detection preprocessor 440, which may employ intensity thresholding or Constant False Alarm Rate (CFAR) processing. The flow of range/Doppler detections 441 may be input to interferometric processor 450, which applies processing in accordance with the type of image formed. For both types of image, the interferometric processor 450 may derive scatterer positions in each resolution cell containing range/Doppler detections 441 by fitting a parametric expression to the multi-channel complex-data of the response. The parametric expressions may incorporate relative spacing of ground-bounce and direct returns from each scatterer, depending on the image type and the size of the resolution cell. In one example, ground-bounce is a radar return from a propagation path that reflects from the ground.

Figure 3:
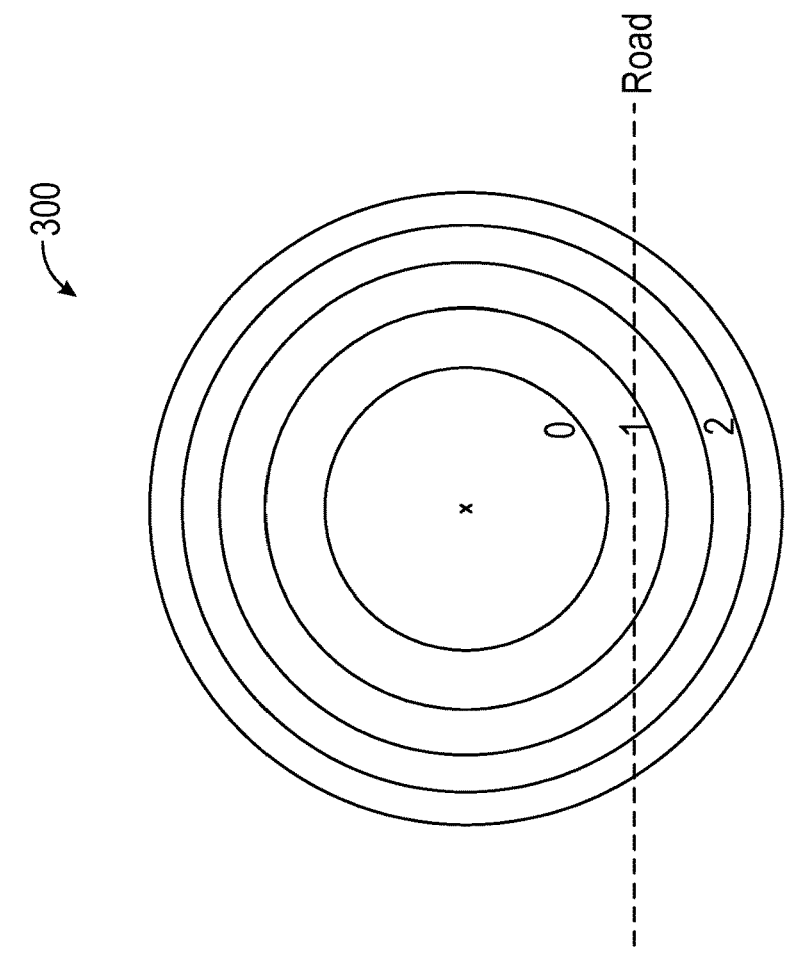
FIG. 3 illustrates an example of relative positions of a direct response from a scatterer.
Figure 3:
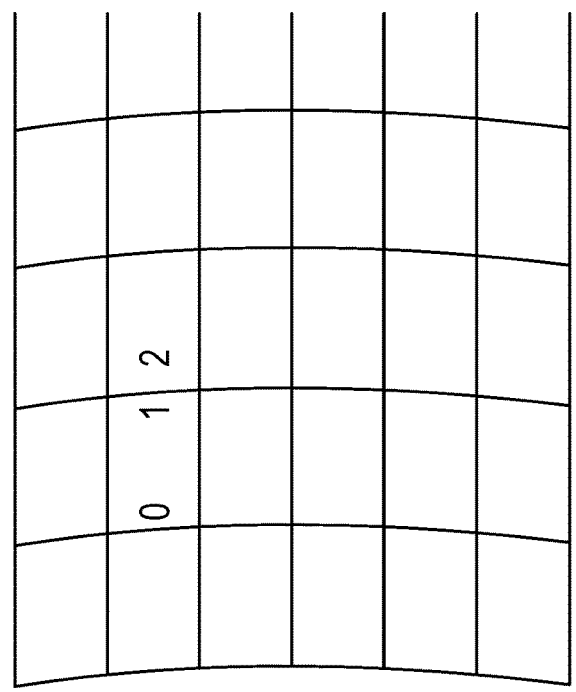

FIG. 3 illustrates an example 300 of relative positions of a direct response and ground-bounce responses from a scatterer. In the example of FIG. 3, no ground-bounce is indicated by 0. In the example of FIG. 3, a single ground-bounce response is indicated by 1 and the bouncing may be on either the transmit path or the receive path. In the example, of FIG. 3, a double ground-bounce response is indicated by 2. Stated another way, 0 indicates the location of the direct response, 1 indicates the location of a single ground-bounce response and 2 indicates the location of a double ground-bounce response.

The right image of FIG. 3 shows the relative positions of the direct response from a scatterer (indicated by a 0), the two single ground-bounce responses from the scatterer (indicated by a 1), and the double ground-bounce response from the scatterer (indicated by a 2) in an image formed via forward-looking SAR (FSAR) processing. Although the extents of the resolution cells depend on the vehicle motion and the position of the radar, the single ground-bounce responses may appear at ground level and the double ground-bounce response appears as a mirror response of the direct response.

Also, of the responses from a single scatterer, the double-bounce response may fall in the narrowest cross-range resolution cell and the direct response may fall in the widest cross-range resolution cell. In one example, interferometric measurements on each response may correspond to the last point of reflection for that response. If the set of responses from a scatterer at a clearance height of the vehicle's undercarriage are resolved from each other, the interferometric processing may treat each resolution cell as including some number (to be determined) of uncorrelated responses. If not, the interferometric processing may treat each resolution cell as including a number of quartets (i.e., sets of four) of correlated responses, with each quartet of correlated responses including the direct return and the ground-bounce returns from a single scatterer.

In one example, a right-handed coordinate system may be used to define vehicle motion along a vehicle trajectory, where x is perpendicular to the vehicle trajectory, y is along the vehicle trajectory and z is vertical, with a cross-range coordinate $\rho = \sqrt{x^2 + z^2}$. In one example, uncorrelated responses $I_j$ in a resolution cell are represented for receive channel j as $$I_j = \sum_k P(y_k, \rho_k) a_k \exp[i(4\pi y_k/\lambda + \alpha_j x_k + \epsilon_j z_k)]$$

where $\alpha_j$ and $\epsilon_j$ are coefficients determined by a receive antenna layout, $P(y,\rho)$ is a real-valued point target response of the image, $\lambda$ is a wavelength of a received electromagnetic wave and the sum is over responses in the resolution cell. In one example, there are four parameters $(a_k, x_k, y_k, z_k)$ to be determined per response $I_j$ and one complex number per receive channel, so with N receive channels, the interferometric processor may determine parameters of up to N/2 responses per resolution cell.

For some of the examples described herein, the responses may be from scatterers located within the resolution cell using mainlobes of the receive antenna. Or, the responses may be from scatterers located outside the resolution cell using sidelobes of the receive antenna. In one example, the parameters may be derived by a simultaneous solution for multiple scatterers via a least-squares fit using numerical optimization, or via an iterative scatterer-by-scatterer solution based on a deconvolution algorithm, for example, a CLEAN algorithm. In one example, the CLEAN algorithm: finds the strongest pixel across all channels (at each iteration). In one example, the CLEAN algorithm measures the interpolated range/cross-range peak position in the channel and uses all channels to derive the parameters for a response or a set of correlated responses. In one example, the CLEAN algorithm subtracts a derived response from all channels.

For forward-looking SAR (FSAR) processing, the quartets of correlated responses in a resolution cell may be represented for receive channel j as $$I_j = \sum_k P(y_k, \rho_k)[a_k \exp(i\epsilon_j z_k) + b_k \cos(\epsilon_j z_k) + c_k \exp(-i\epsilon_j z_k)]$$

$$\exp[i(4\pi y_k/\lambda + \alpha_j x_k)]$$

There are six parameters $(a_k, b_k, c_k, x_k, y_k, z_k)$ to be determined per quartet, so the interferometric processor may determine parameters of up to N/3 quartets per resolution cell.

The left image of FIG. 3 shows an example of relative positions of a direct response from a scatterer (indicated by a 0), two single ground-bounce responses from the scatterer (indicated by a 1), and a double ground-bounce response from the scatterer (indicated by a 2) in an image formed via conventional processing. In one example, range separation of the responses is a product of scatterer height and sine of a grazing angle, so the responses may rarely be resolved. Accordingly, the processing may process quartets of responses. The quartets of correlated responses in a resolution cell may be represented for receive channel j as $$I_j = \sum_k \exp[i(\alpha_j x_k + 4\pi y_k/\lambda)]$$
$$\{a_k P(x_k, y_k)\exp(i\epsilon_j z_k) + b_k P(x_k, y_k + z_k \sin\delta)\exp[i4\pi z_k \sin\delta/\lambda]$$
$$\cos(\epsilon_j z_k) + c_k P(x_k, y_k + 2z_k \sin\delta)\exp[i(8\pi z_k \sin\delta/\lambda - \epsilon_j z_k)]\}$$

where $\delta$ is a radar depression angle. Given a small depression angle, in one example, point target responses of a quartet may be considered collocated and the quartets of correlated responses may be simplified to $$I_j = \sum_k P(x_k, y_k)\exp[i(\alpha_j x_k + 4\pi y_k/\lambda)]\{a_k \exp(i\epsilon_j z_k) +$$
$$b_k \exp[i4\pi z_k \sin\delta/\lambda]\cos(\epsilon_j z_k) + c_k \exp[i(8\pi z_k \sin\delta/\lambda - \epsilon_j z_k)]\}$$

There are six parameters ($a_k$, $b_k$, $c_k$, $x_k$, $y_k$, $z_k$) to be determined per quartet, so the interferometric processor may determine parameters of up to N/3 quartets per resolution cell.

In one example, the interferometric processor 450 may output range/cross-range and interferometric response position locations that may be fused into scatterer position measurements in a scatterer processor 460, accounting for heights of some ground-bounce responses being measured as zero (ground level) or the negative of the actual height. In one example, scatterer measurements may be clustered to provide object (e.g., obstacle) location and extent measurements.

Figure 5:
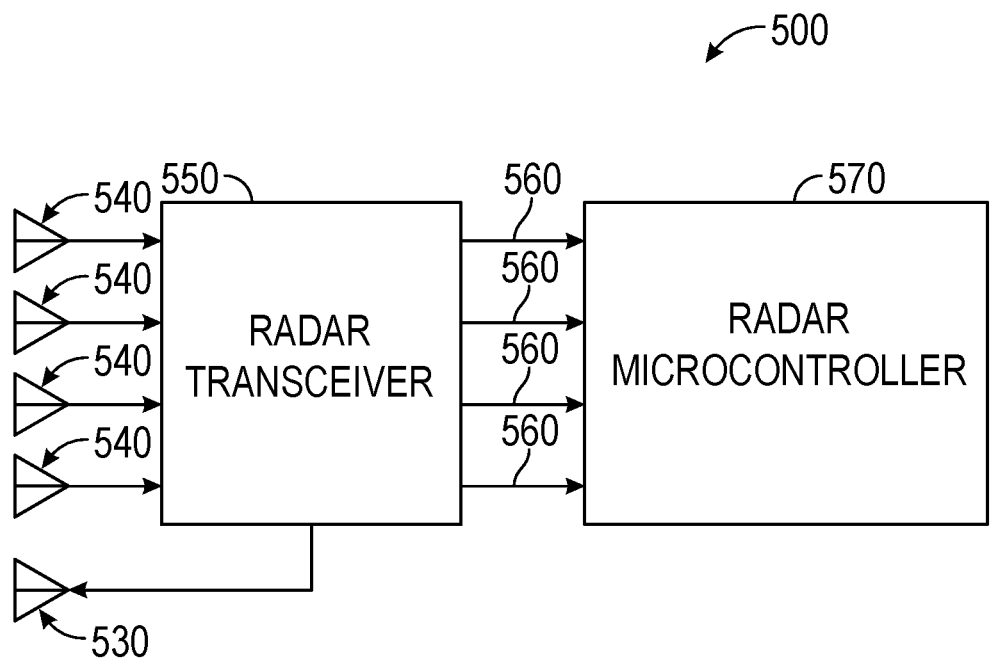
FIG. 5 illustrates an example block diagram of an automotive radar separated into transmit antenna elements, receive antenna elements, an automotive radar transceiver with digitized data flowing from the radar transceiver, and a radar microcontroller.

FIG. 5 illustrates an example block diagram 500 of an automotive radar separated into transmit antenna elements 530, receive antenna elements 540, an automotive radar transceiver 550 with digitized data 560 flowing from the radar transceiver 550, and a radar microcontroller 570. In one example, radar microcontroller may include one or more of the components shown in FIG. 4.

FIG. 6 illustrates an example flow diagram 600 for measuring positions and extents of obstacles on a road. In block 610, generate a transmit radar waveform. In one example, the transmit radar waveform may be a coherent pulsed radar waveform with a plurality of pulses over a coherent time duration. In one example, the step in block 610 may be performed by a radar transceiver, for example, the radar transceiver 410 shown in FIG. 4.

In block 620, receive a receive radar waveform and generate a digitized radar data from the receive radar waveform. In one example, the receive radar waveform is a scaled replica of the transmit radar waveform. In one example, the receive radar waveform is a scaled replica of the transmit radar waveform with a time delay τ (tau) and a Doppler shift ν (nu) for a scatterer. In one example, the digitized radar data includes amplitude information and phase information of the receive radar waveform. In one example, the step in block 620 may be performed by a radar transceiver, for example, the radar transceiver 410 shown in FIG. 4.

In block 630, form a flow of range/cross-range radar images from the digitized radar data. In one example, the flow of range/cross-range radar images includes a plurality of resolution cells. In one example, the plurality of resolution cells includes a range resolution determined by a signal bandwidth and a cross-range resolution determined by an angular rotation of radar line of sight. In one example, the step in block 630 may be performed by an image processor, for example, the image processor 430 shown in FIG. 4.

In block 640, generate a flow of range/Doppler detections from the flow of range/cross-range radar images. In one example, the flow of range/Doppler detections is used for thresholding, Constant False Alarm Rate (CFAR) detection, or similar detection operation. In one example, the step in block 640 may be performed by a detection processor, for example, the detection processor 440 shown in FIG. 4.

In block 650, create interferometric measurements to generate a flow of response position locations using the flow of range/Doppler detections by fitting a parametric expression. In one example, the parametric expression may incorporate relative spacing of ground-bounce and direct returns from each scatterer. In one example, the step in block 650 may be performed by an interferometric processor, for example, the interferometric processor 450 shown in FIG. 4.

In block 660, derive scatterer positions and obstacle position and extent measurements from the flow of response position locations. In one example, the scatterer positions and obstacle position and extent measurements may be derived by clustering of response positions, accounting for some ground-bounce response positions being measured at ground level (height zero) or at the negative of the actual height. In one example, the step in block 660 may be performed by a scatterer processor, for example, the scatterer processor 460 shown in FIG. 4.

In one aspect, one or more of the process or flow disclosed herein may be executed by one or more processors which may include hardware, software, firmware, etc. The one or more processors, for example, may include one or more memory units to execute software or firmware needed to perform any part of the process or flow described herein. In one example, the memory unit may be one or more of the following: a random access memory (RAM), a read only memory (ROM), a programmable ROM (PROM), an erasable PROM (EPROM), and/or an electrically erasable PROM (EEPROM), etc.

In one example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for performing any of the process or flow described herein. Those skilled in the art will recognize how best to implement the described functionality presented throughout this disclosure depending on the particular application and the overall design constraints imposed on the overall system.

What is claimed is:

1. A method for deriving one or more scatterer position, the method comprising:
   receiving a receive radar waveform and generating digitized radar data from the receive radar waveform;
   generating one or more interferometric measurements from the digitized radar data to generate a set of response position locations using a set of range/Doppler detections by fitting a parametric expression; and
   deriving the one or more scatterer position from the set of response position locations.

2. The method of claim 1, wherein the receive radar waveform is a scaled replica of a transmit radar waveform with a time delay $\tau$ (tau) and a Doppler shift $\nu$ (nu) for a scatterer.

3. The method of claim 1, wherein the receive radar waveform is a scaled replica of a transmit radar waveform.

4. The method of claim 3, further comprising generating the transmit radar waveform, wherein the transmit radar waveform is a coherent pulsed radar waveform with a plurality of pulses over a coherent time duration.

5. The method of claim 1, further comprising forming a set of range/cross-range radar images from the digitized radar data.

6. The method of claim 5, wherein the set of range/cross-range radar images comprises a plurality of resolution cells.

7. The method of claim 6, wherein the plurality of resolution cells includes a range resolution determined by a signal bandwidth and a cross-range resolution determined by an angular rotation of a radar line of sight.

8. The method of claim 5, further comprising generating the set of range/Doppler detections from the set of range/cross-range radar images.

9. The method of claim 1, wherein the parametric expression includes a relative spacing of a ground-bounce and a direct return from a scatterer.

10. The method of claim 1, further comprising deriving the one or more scatterer position by determining a simultaneous solution for a plurality of scatterers with a least-squares fit using numerical optimization.

11. The method of claim 1, further comprising deriving the one or more scatterer position by determining an iterative scatterer-by-scatterer solution based on a deconvolution algorithm.

12. The method of claim 11, wherein the deconvolution algorithm is a CLEAN algorithm.

13. An apparatus for deriving one or more scatterer position, the apparatus comprising:
   a radar transceiver configured to receive a receive radar waveform and to generate a digitized radar data from the receive radar waveform;
   an interferometric processor configured to generate one or more interferometric measurements from the digitized radar data to generate a set of response position locations using a set of range/Doppler detections by fitting a parametric expression; and
   a scatterer processor, coupled to the interferometric processor, configured to derive the one or more scatterer position from the set of response position locations.

14. The apparatus of claim 13, wherein the interferometric processor and the scatterer processor are two separate components of the apparatus.

15. The apparatus of claim 13, wherein the receive radar waveform is a scaled replica of a transmit radar waveform with a time delay $\tau$ (tau) and a Doppler shift $\nu$ (nu) for a scatterer.

16. The apparatus of claim 15, wherein the transmit radar waveform is a coherent pulsed radar waveform with a plurality of pulses over a coherent time duration.

17. The apparatus of claim 13, further comprising an image processor, coupled to the radar transceiver, to form a set of range/cross-range radar images from the digitized radar data.

18. The apparatus of claim 17, further comprising a detection processor, coupled to the image processor, to generate the set of range/Doppler detections from the set of range/cross-range radar images.

19. The apparatus of claim 13, wherein the scatterer processor derives the one or more scatterer position by determining a simultaneous solution for a plurality of scatterers with a least-squares fit using numerical optimization.

20. The apparatus of claim 13, wherein the scatterer processor derives the one or more scatterer position by determining an iterative scatterer-by-scatterer solution based on a deconvolution algorithm.

21. The apparatus of claim 13, wherein the scatterer processor is further configured to derive one or more extent measurements from the set of response position locations.

22. The apparatus of claim 13, wherein the one or more scatterer position includes at least one obstacle position.

23. The method of claim 1, further comprising deriving one or more extent measurements from the set of response position locations.

24. The method of claim 1, wherein the one or more scatterer position includes at least one obstacle position.

* * * * *